(12) United States Patent
Yang et al.

(10) Patent No.: US 11,719,601 B2
(45) Date of Patent: Aug. 8, 2023

(54) DETECTOR CAPABLE OF DETECTING BEARING FAULTS IN ADVANCE

(71) Applicant: OPENEXTECH (HANGZHOU) CO., LTD, Hangzhou (CN)

(72) Inventors: Qingde Yang, Hangzhou (CN); Qiao Pang, Hangzhou (CN)

(73) Assignee: OPENEXTECH (HANGZHOU) CO., LTD

( * ) Notice: Subject to any disclaimer, the term of this patent is extended or adjusted under 35 U.S.C. 154(b) by 0 days.

(21) Appl. No.: 17/777,717

(22) PCT Filed: Dec. 25, 2020

(86) PCT No.: PCT/CN2020/139602
§ 371 (c)(1),
(2) Date: May 18, 2022

(87) PCT Pub. No.: WO2021/129834
PCT Pub. Date: Jul. 1, 2021

(65) Prior Publication Data
US 2023/0003617 A1    Jan. 5, 2023

(30) Foreign Application Priority Data
Dec. 27, 2019 (CN) .......................... 201911373318.3

(51) Int. Cl.
*G01M 13/045* (2019.01)
(52) U.S. Cl.
CPC .................. *G01M 13/045* (2013.01)
(58) Field of Classification Search
None
See application file for complete search history.

(56) References Cited

FOREIGN PATENT DOCUMENTS

| CN | 2543051 Y | * | 4/2003 |
|---|---|---|---|
| CN | 202083465 U | | 12/2011 |
| CN | 203981267 U | | 12/2014 |
| CN | 108955862 A | | 12/2018 |

(Continued)

OTHER PUBLICATIONS

International Search Report dated Mar. 24, 2021 for International Patent Application No. PCT/CN2020/139602.

*Primary Examiner* — Raul J Rios Russo
*Assistant Examiner* — Carl F. R. Tchatchouang
(74) *Attorney, Agent, or Firm* — Fishman Stewart PLLC

(57) ABSTRACT

A detector capable of detecting bearing faults in advance is disclosed. The detector includes a microprocessor with an input terminal connected to a power supply and an output terminal connected to a detection information output device. A resonance enhanced piezoelectric sensor is provided. A sensor trigger detection circuit is electrically connected between the sensor and the microprocessor. An input terminal of the sensor trigger detection circuit is connected in parallel with a sensor signal selection circuit. The sensor signal selection circuit is connected in series with a sensor signal processing circuit. An output terminal of the sensor signal processing circuit is connected in series with a programmable gain circuit. The programmable gain circuit is connected to the microprocessor. The sensor trigger detection circuit, the sensor signal selection circuit, the sensor signal processing circuit, and the programmable gain circuit are respectively connected to the power supply.

18 Claims, 5 Drawing Sheets

(56) References Cited

FOREIGN PATENT DOCUMENTS

| CN | 110907178 A | 3/2020 |
|----|-------------|--------|
| CN | 210953406 U | 7/2020 |
| JP | 2001183228 A | 7/2001 |
| JP | 2008-139284 A | 6/2008 |

* cited by examiner

DETECTOR CAPABLE OF DETECTING BEARING FAULTS IN ADVANCE

CROSS REFERENCE TO RELATED APPLICATION

This application claims priority to International Patent Application No. PCT/CN2020/139602 filed Dec. 25, 2020, which also claims priority to China Patent Application No. 201911373318.3 filed Dec. 27, 2019, the contents of each of which is hereby incorporated by reference in its entirety.

TECHNICAL FIELD

The present disclosure relates to the technical field of monitoring of mechanical equipment faults, in particular to a detector capable of detecting bearing faults in advance.

BACKGROUND

At present, main sensors used in the field of mechanical equipment fault diagnosis and state monitoring still mainly adopt vibration sensors, such as a piezoelectric acceleration sensor (also called an accelerometer or an acceleration sensor), the function of which is to convert mechanical vibrations into electrical signals. When the piezoelectric acceleration sensor senses a vibration signal, its output terminal will generate a charge in direct proportion to a vibration acceleration, which can not only measure the acceleration, speed and displacement of vibration, but also measure some vibration impact signals with larger amplitudes. Because of its small size, light weight, wide frequency band, high reliability, and large dynamic range, the piezoelectric acceleration sensor can be widely applied in the field of vibration measurement.

However, for heavy-load, slow-speed rotating equipment, its fault signal is a transient, small-amplitude impact signal, as well as poor lubrication of bearings and other conditions, which cannot be detected by the use of the current vibration sensors and vibration meters, and the detection cannot be achieved by a vibration analysis method. For the detection of these transient signals, the defects of the vibration sensors are obvious, mainly in the following aspects:

1. The conventional vibration sensor is of a resonance-reduced type. That is, in order to extract more frequency signals, the original intention for designing a sensor is to absorb the residual vibration, such that a vibration analyzer is mainly used to collect periodic signals, however it is difficult to capture transient fault signals with limited impact energy.

2. The frequency components of the fault signals are very complex, so they are difficultly limited by the frequency band of the vibration analyzer. Moreover, for analysis of a too wide frequency band, both hardware overhead and software overhead are very large.

3. Early fault signals are often very small, and are likely to be drowned by external noise. For example, in an actual operating environment of industrial equipment with very noisy environmental noise, in the case, transient signals without characteristic frequencies are difficultly extracted from the environmental noise by the vibration analysis method.

SUMMARY

Based on this, the present disclosure aims to provide a detector capable of detecting bearing faults in advance, which can enhance the signal strength and reduce the interference of environmental noise, and can effectively acquire an initial transient signal of a bearing fault and timely generate fault information.

In order to achieve the above objective, the present disclosure provides a detector capable of detecting bearing faults in advance. The detector includes a microprocessor, an input terminal of which is connected to a power supply and an output terminal of which is connected to a detection information output device; further includes a resonance enhanced piezoelectric sensor. A sensor trigger detection circuit is electrically connected between the resonance enhanced piezoelectric sensor and the microprocessor; an input terminal of the sensor trigger detection circuit is connected in parallel with a sensor signal selection circuit; the sensor signal selection circuit is connected in series with a sensor signal processing circuit; an output terminal of the sensor signal processing circuit is connected with a programmable gain circuit; the programmable gain circuit is connected to the microprocessor; the sensor trigger detection circuit, the sensor signal selection circuit, the sensor signal processing circuit, and the programmable gain circuit are respectively connected to the power supply.

As a technical solution in one embodiment, the resonance enhanced piezoelectric sensor includes an anode conductive rod and a cathode conductive rod arranged oppositely; a piezoelectric ceramic sheet is clamped between the anode conductive rod and the cathode conductive rod; an end of the anode conductive rod and an end of the cathode conductive rod that clamp the piezoelectric ceramic sheet are sleeved outside by a conductive rod connecting and fastening sleeve; electric insulation devices are arranged between the conductive rod connecting and fastening sleeve and the anode conductive rod and between the conductive rod connecting and fastening sleeve and the piezoelectric ceramic sheet; and the conductive rod connecting and fastening sleeve and the cathode conductive rod are in clearance fit connection.

As a technical solution in one embodiment, the electric insulation devices include an electric insulation ring arranged between the piezoelectric ceramic sheet and the conductive rod connecting and fastening sleeve, and an electric insulation sleeve arranged between the anode conductive rod and the conductive rod connecting and fastening sleeve; one end of the electric insulation sleeve resists against the electric insulation ring, and another end of the electric insulation sleeve extends to an outer side of the conductive rod connecting and fastening sleeve.

As a technical solution in one embodiment, end surfaces of the anode conductive rod, the cathode conductive rod, and the piezoelectric ceramic sheet are respectively circular; an end surface diameter of the cathode conductive rod is greater than an end surface diameter of the piezoelectric ceramic sheet; and a part of the end surface of the cathode conductive rod exceeding the end surface of the piezoelectric ceramic sheet forms an insulation ring positioning platform of the electric insulation ring.

As a technical solution in one embodiment, an end of the anode conductive rod that is in contact with the piezoelectric ceramic sheet is provided with an insulation sleeve limiting convex ring; and an insulation sleeve limiting concave ring fitting with a limiting boss is arranged on the electric insulation sleeve.

As a technical solution in one embodiment, the sensor trigger detection circuit includes a low-pass filter resistor R31 which is electrically connected to an output terminal of the resonance enhanced piezoelectric sensor; an output terminal of the low-pass filter resistor R31 is grounded through a low-pass filter capacitor C34; the output terminal of the low-pass filter resistor R31 is also connected to a non-inverting input terminal of an operational amplifier A1; an inverting input terminal of the operational amplifier A1 is connected to its output terminal; the output terminal of the operational amplifier A1 is connected to the microprocessor; a power terminal of the operational amplifier A1 is connected to the power supply through a voltage dividing resistor R59; the voltage dividing resistor R59 is also safely grounded through a capacitor C52.

As a technical solution in one embodiment, the sensor signal selection circuit includes a serial frequency selection circuit and a parallel frequency selection circuit which are connected in series to an input terminal of the low-pass filter resistor in sequence, and an output terminal of the serial frequency selection circuit is also connected to the sensor signal processing circuit;

the serial frequency selection circuit includes a polar capacitor C33 connected to the input terminal of the low-pass filter resistor R31; an output terminal of the polar capacitor C33 is connected in series with a capacitor C45 and an inductor L3 in sequence; an output terminal of the inductor L3 is connected to the sensor signal processing circuit; the parallel frequency selection circuit includes an inductor L4 and a capacitor C16 which are connected in parallel to an output terminal of the inductor L3, and output terminals of the capacitor C16 and the inductor L4 are commonly grounded.

As a technical solution in one embodiment, the sensor signal processing circuit is set as a band-pass filter circuit, including a resistor R50 and a capacitor C48 which are arranged in series; an input terminal of the resistor R50 is connected to the output terminal of the inductor L3; an input terminal of the capacitor C48 is connected to a capacitor C47; an output terminal of the capacitor C48 is connected to a resistor R51; an output terminal of the capacitor C48, an output terminal of the capacitor C47 and an output terminal of the resistor R51 are respectively connected to the programmable gain circuit.

As a technical solution in one embodiment, the programmable gain circuit includes a programmable amplifier U1; an external reference terminal of the programmable amplifier U1 is connected to a reference voltage circuit; an analog input terminal of the programmable amplifier U1 is connected to the band-pass filter circuit; an analog output terminal of the programmable amplifier U1 is connected to the microprocessor.

As an improvement of the above technical solution, the detection information output device includes an audio conversion circuit arranged in the microprocessor, an output terminal of the audio conversion circuit being connected to an audio player; and further includes a liquid crystal display (LCD) connected to the output terminal of the microprocessor.

According to the specific embodiments provided by the present disclosure, the present disclosure discloses the following technical effects.

The present disclosure provides a detector capable of detecting bearing faults in advance, including a microprocessor, an input terminal of which is connected with a power supply, and an output terminal of which is connected with a detection information output device, and further including a resonance enhanced piezoelectric sensor, where a sensor trigger detection circuit is electrically connected between the resonance enhanced piezoelectric sensor and the microprocessor; an input terminal of the sensor trigger detection circuit is connected in parallel with a sensor signal selection circuit; the sensor signal selection circuit is connected in series with a sensor signal processing circuit; an output terminal of the sensor signal processing circuit is connected with a programmable gain circuit; the programmable gain circuit is connected to the microprocessor; the sensor trigger detection circuit, the sensor signal selection circuit, the sensor signal processing circuit, and the programmable gain circuit are respectively connected to the power supply. The present disclosure has the beneficial effects: The resonance enhanced piezoelectric sensor can detect fault signals of heavy-load, slow-speed rotating equipment. The above fault signals often have the characteristics of transient performance, a small amplitude, and the like. Under the cooperation of related circuits, detected impact signal energy can be finally enriched at a frequency between 30 KHz and 40 KHz, which increases the signal strength and reduces the interference of environmental noise as much as possible, so that the fault signals are easily detected. In addition, after the cooperation of various circuits, the output signals form a resonance enhancement signal with slow attenuation (lasting for 20 cycles or above) and can form an audio signal under the action of the microprocessor; the audio signal is output by the detection information output device for analysis by fault diagnosis engineers, so as to acquire an initial fault signal of the detected equipment, such that the fault can be conveniently processed and eliminated in time.

BRIEF DESCRIPTION OF THE DRAWINGS

In order to describe the embodiments of the present disclosure or technical solutions in the existing art more clearly, drawings required to be used in the embodiments will be briefly introduced below. Apparently, the drawings in the descriptions below are only some embodiments of the present disclosure. Those ordinary skilled in the art also can acquire other drawings according to these drawings without creative work.

Figure 1:
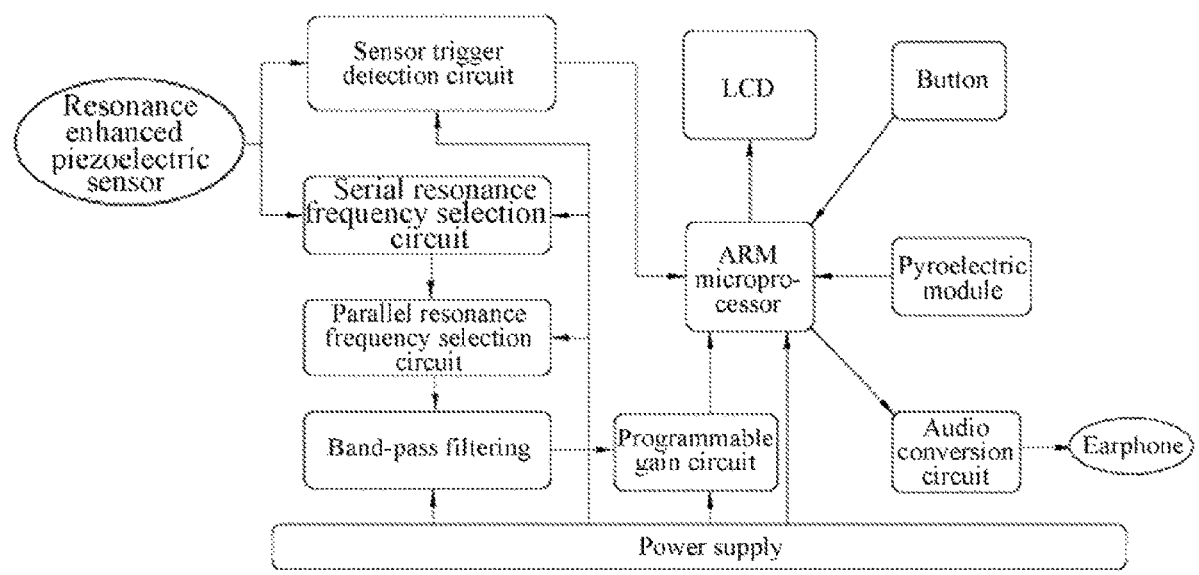
FIG. 1 is a structural block diagram of an embodiment of the present disclosure.

In the drawings: 1: anode conductive rod; 2: cathode conductive rod; 3: piezoelectric ceramic sheet; 4: conductive rod connecting and fastening sleeve; 5: electric insulation ring; 6: electric insulation sleeve; 7: clamping and pre-tightening slope.

DETAILED DESCRIPTION

The following clearly and completely describes the technical solution in the embodiments of the present disclosure in combination with the accompanying drawings of the embodiments of the present disclosure. Apparently, the described embodiments are only part of the embodiments of the present disclosure, not all embodiments. Based on the embodiments in the present disclosure, all other embodiments obtained by those ordinary skilled in the art without creative work shall fall within the protection scope of the present disclosure.

The present disclosure aims to provide a detector capable of detecting bearing faults in advance, which can enhance the signal strength and reduce the interference of environmental noise, and can effectively acquire an initial transient signal of a bearing fault and timely generate fault information.

In order to make the above-mentioned purposes, characteristics and advantages of the present disclosure more obvious and understandable, the present disclosure is further described in detail below with reference to the accompanying drawings and specific implementation modes.

As shown in FIG. 1, a detector capable of detecting bearing faults in advance includes a microprocessor, an input terminal of which is connected to a power supply and an output terminal of which is connected to a detection information output device. The power supply can provide a working voltage for electronic components in the whole detector. The detection information output device includes an audio conversion circuit arranged in the microprocessor, an output terminal of the audio conversion circuit being connected to an audio player, and further includes an LCD connected to the output terminal of the microprocessor. The audio player may be an earphone that is worn by a fault diagnosis engineer. The microprocessor is an ARM microprocessor that can convert a fault signal into an audio signal played via the earphone. Buttons in FIG. 1 are input devices of the detector for human-machine interaction. The buttons include an up button, a down button, a confirm button, a back button, and a measure button.

This embodiment further includes a resonance enhanced piezoelectric sensor. A sensor trigger detection circuit is electrically connected between the resonance enhanced piezoelectric sensor and the microprocessor; an input terminal of the sensor trigger detection circuit is connected in parallel with a sensor signal selection circuit; the sensor signal selection circuit is connected in series with a sensor signal processing circuit; an output terminal of the sensor signal processing circuit is connected with a programmable gain circuit; the programmable gain circuit is connected to the microprocessor; the sensor trigger detection circuit, the sensor signal selection circuit, the sensor signal processing circuit, and the programmable gain circuit are respectively connected to the power supply. The resonance enhanced piezoelectric sensor is configured to pick up fault signals. The resonance enhanced piezoelectric sensor is used for detecting whether it is normally connected to the microprocessor; the sensor signal selection circuit, the sensor signal processing circuit, and the programmable gain circuit achieve selecting and processing of a frequency used by the resonance enhanced piezoelectric sensor during detecting signal for further analysis and use by the microprocessor.

Figure 2:
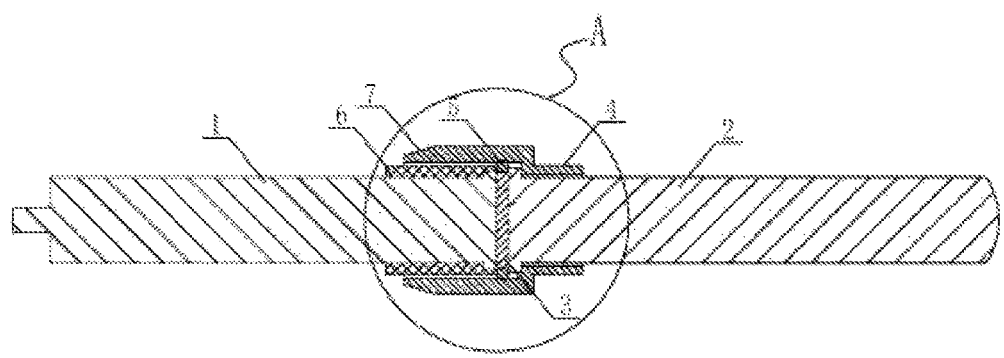
FIG. 2 is a schematic structural diagram of an embodiment of the present disclosure.
Figure 3:
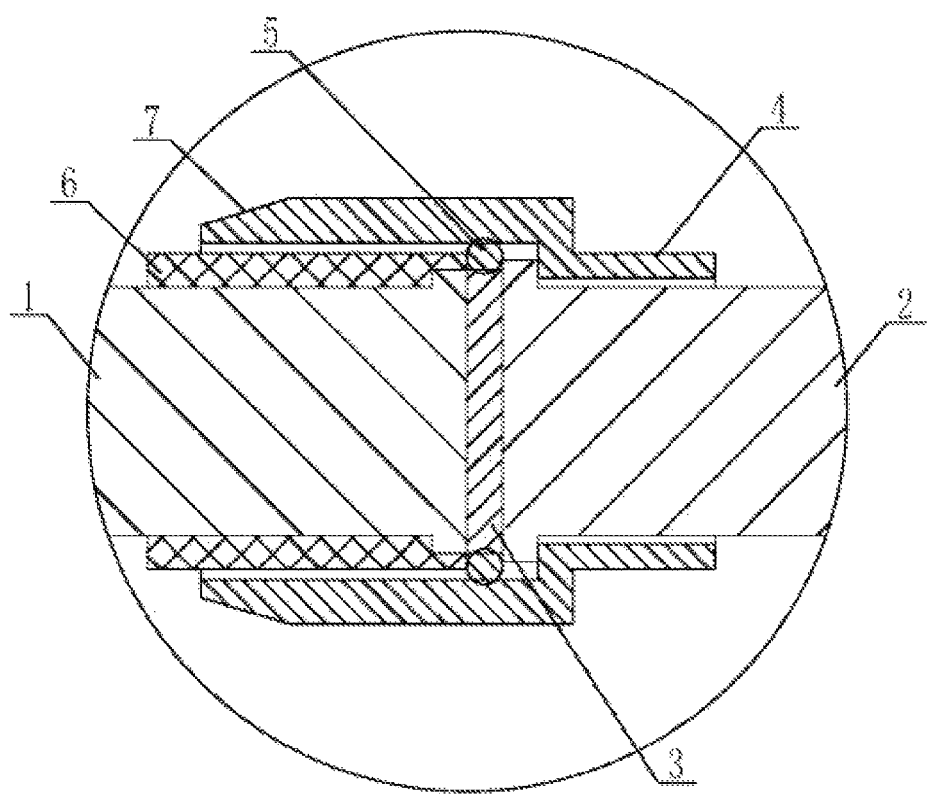
FIG. 3 is an enlarged schematic structural diagram of Part A in FIG. 1 according to the embodiment of the present disclosure.

As shown in FIG. 2 and FIG. 3, the resonance enhanced piezoelectric sensor includes an anode conductive rod 1 and a cathode conductive rod 2 which are arranged oppositely to each other; a piezoelectric ceramic sheet 3 is clamped between the anode conductive rod 1 and the cathode conductive rod 2; an end of the anode conductive rod 1 and an end of the cathode conductive rod 2 that clamp the piezoelectric ceramic sheet 3 are sleeved outside by a conductive rod connecting and fastening sleeve 4; electric insulation devices are arranged between the conductive rod connecting and fastening sleeve 4 and the anode conductive rod 1 and between the conductive rod connecting and fastening sleeve 4 and the piezoelectric ceramic sheet 3; and the conductive rod connecting and fastening sleeve 4 and the cathode conductive rod 2 are in clearance fit connection.

In this embodiment, a main body portion of the anode conductive rod 1 is of a cylinder structure with a diameter of 7 mm and a length of 35 mm; and the cathode conductive rod 2 is of a cylinder structure with a diameter of 7 mm and a length of 40 mm. Materials of the anode conductive rod 1, the cathode conductive rod 2, and the conductive rod connecting and fastening sleeve 4 are stainless steel 304 with good high-temperature resistance and corrosion resistance and low requirement for a use environment. In an embodiment, the piezoelectric ceramic sheet 3 is of a wafer structure with a diameter of 7 mm and a thickness of 1 mm, and its material is lead zirconate titanate. The conductive rod connecting and fastening sleeve 4 assembles and fixes individual components of the sensor.

Specifically, the electric insulation devices include an electric insulation ring 5 arranged between the piezoelectric ceramic sheet 3 and the conductive rod connecting and fastening sleeve 4, and an electric insulation sleeve 6 arranged between the anode conductive rod 1 and the conductive rod connecting and fastening sleeve 4, where one end of the electric insulation sleeve 6 resists against the electric insulation ring 5, and the other end of the electric insulation sleeve 6 extends to an outer side of the conductive rod connecting and fastening sleeve 4. The electric insulation ring 5 is a ceramic insulation ring, and the electric insulation sleeve 6 is a plastic sleeve. It can be seen through the above structures that the electric insulation sleeve 6 and the electric insulation ring 5 can isolate the anode conductive rod 1 from the cathode conductive rod 2 to prevent an internal short circuit of the sensor. The conductive rod connecting and fastening sleeve 4 is in direct contact with the cathode conductive rod 2, so that they are electrically conducted. At the same time, the cathode conductive rod 2 is electrically conducted to one end surface of the piezoelectric ceramic sheet 3.

In an actual working process of the sensor, a resonator system is ingeniously constructed inside the conductive rod connecting and fastening sleeve 4. A vibrator of the resonator system is the piezoelectric ceramic sheet 3. A restoring force of the system is from a pre-tightening force of the conductive rod connecting and fastening sleeve 4 for the anode conductive rod 1, the cathode conductive rod 2, and the piezoelectric ceramic sheet 3. Under a suitable pre-tightening force, when the piezoelectric ceramic sheet 3 generates a micro displacement Δx, the restoring force F is approximately equal to −kΔx. The mass of the piezoelectric ceramic sheet 3 is m, and the resonance frequency is:

$$f = \frac{1}{2\pi\sqrt{\frac{m}{k}}}$$

The piezoelectric ceramic sheet 3 of this embodiment is used as a mass block, which has a light weight, so that it is favorable for a sensor structure to form resonance which is a basis for picking up a transient weak impact signal, thereby achieving pickup and resonance enhancement of a fault signal.

In this embodiment, the end surfaces of the anode conductive rod 1, the cathode conductive rod 2 and the piezoelectric ceramic sheet 3 are respectively circular, and an end surface diameter of the cathode conductive rod 2 is greater than an end surface diameter of the piezoelectric ceramic sheet 3. A part of the end surface of the cathode conductive rod 2 exceeding the end surface of the piezoelectric ceramic sheet 3 forms an insulation ring positioning platform of the electric insulation ring 5, so that the electric insulation ring 5 is in clearance fit with the piezoelectric ceramic sheet 3 and the conductive rod connecting and fastening sleeve 4. An end of the anode conductive rod 1 that is in contact with the piezoelectric ceramic sheet 3 is provided with an insulation sleeve limiting convex ring; and an insulation sleeve limiting concave ring fitting with a limiting boss is arranged on the electric insulation sleeve 6, so that the anode conductive rod 1 and the electric insulation sleeve 6 are in interference fit with each other. An end of the cathode conductive rod 2 that is in contact with the piezoelectric ceramic sheet 3 is provided with a fastening sleeve limiting ring platform, and the conductive rod connecting and fastening sleeve 4 is provided with a fastening sleeve limiting ring slot fitting with the fastening sleeve limit ring platform. The electric insulation ring 5 and a portion of the electric insulation sleeve 6 are respectively assembled in the fastening sleeve limiting ring slot, so that the conductive rod connecting and fastening sleeve 4 and the cathode conductive rod 2 are in clearance fit with each other.

During assembly, after a certain pre-tightening force is applied among the anode conductive rod 1, the piezoelectric ceramic sheet 3 and the cathode conductive rod 2, and an end portion of the electric insulation ring 5 is pressed tightly to keep the pre-tightening force among the anode conductive rod 1, the piezoelectric ceramic sheet 3 and the cathode conductive rod 2 unchanged. On the premise that the mass m of the piezoelectric ceramic sheet 3 remains unchanged, by adjusting the pre-tightening force to change the k value, a resonance frequency f=31 KHz can be obtained.

In this embodiment, a clamping and pre-tightening slope 7 is provided on an outer peripheral surface of an end of the electric rod connecting and fastening sleeve 4 sleeving the anode conductive rod 1. After the end portion of the electric insulation ring 5 is pressed tightly, in order to keep the pre-tightening force among the anode conductive rod 1, the piezoelectric ceramic sheet 3, the cathode conductive rod 2 unchanged, a clamping tool can be used to clamp the clamping and pre-tightening slope 7 and squeeze it inwards, so that an inner surface of the clamping and pre-tightening slope 7 tightly clamps the outer periphery of the electric insulation sleeve 6, thereby achieving the effect of maintaining the pre-tightening force.

Figure 4:
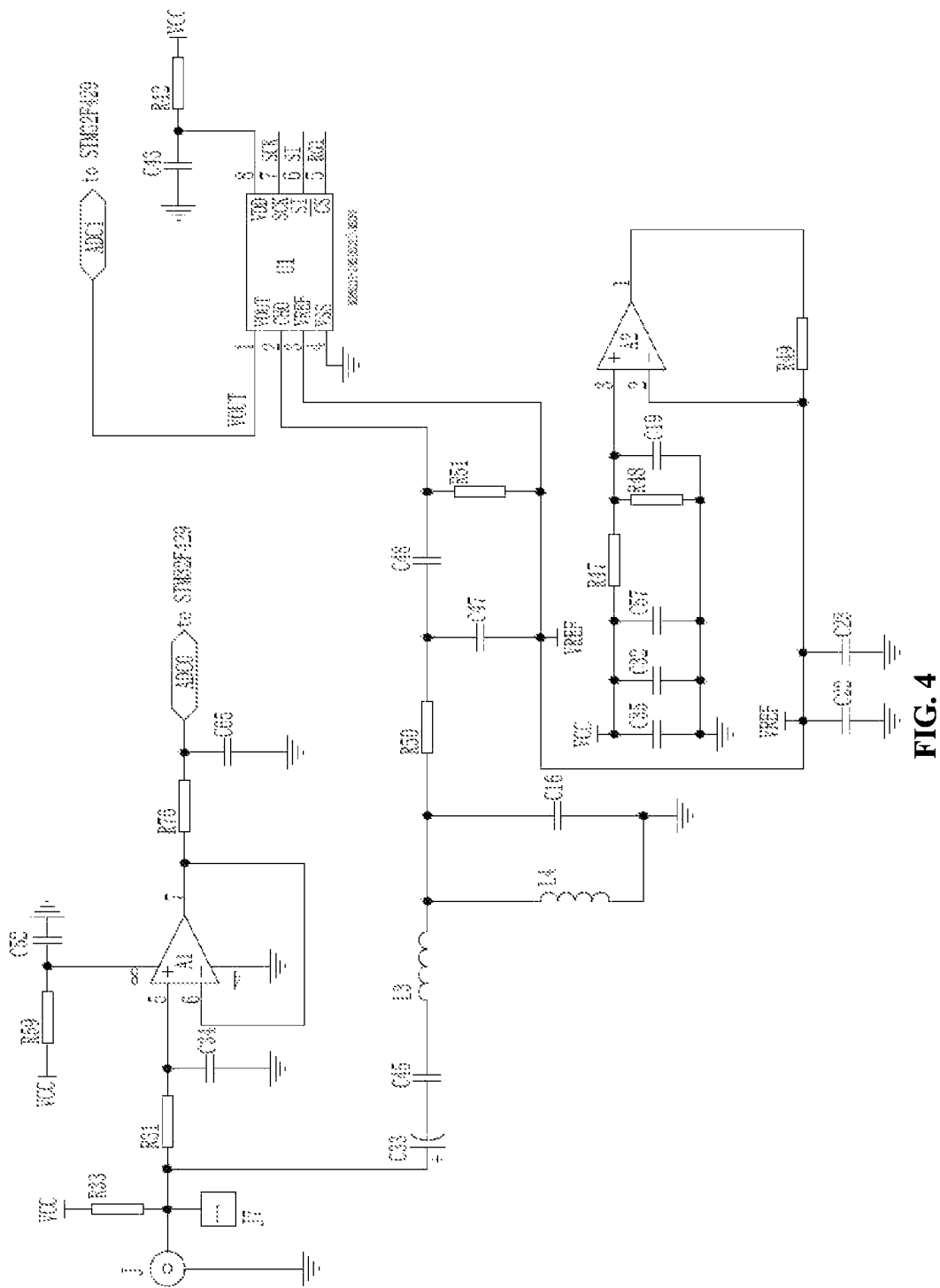
FIG. 4 is a schematic circuit diagram of a sensor trigger detection circuit, a sensor signal selection circuit, a sensor signal processing circuit, and a programmable gain circuit according to an embodiment of the present disclosure.

As shown in FIG. 4, the sensor trigger detection circuit includes a low-pass filter resistor R31 which is electrically connected to an output terminal of the resonance enhanced piezoelectric sensor; an output terminal of the low-pass filter resistor R31 is grounded through a low-pass filter capacitor C34; the output terminal of the low-pass filter resistor R31 is also connected to a non-inverting input terminal of an operational amplifier A1; an inverting input terminal of the operational amplifier A1 is connected to its output terminal; the output terminal of the operational amplifier A1 is connected to the microprocessor; a power terminal of the operational amplifier A1 is connected to the power supply through a voltage dividing resistor R59; the voltage dividing resistor R59 is also safely grounded through a capacitor C52. J is a coaxial input port of a signal, and J7 is a clip contact, which correspond respectively to internal and external connection inputs for signals. R76 and C65 are used for low-pass filtering, and ADC0 and ADC1 are two-stage output signals connected to a pin for data collection of a single-chip microcomputer. C19 is an input bypass capacitor of an amplifier for filtering and decoupling. R42 and C57 are combined to stabilize a power voltage. R33 provides a bias voltage for the sensor.

The operational amplifier A1 may be TLC2272ACD. The low-pass filter resistor R31 and the low-pass filter capacitor C34 form a low-pass filter, and the operational amplifier A1 is then used for signal following, which solves the problems of small charge signal and low drive capability of the output terminal of the resonance enhanced piezoelectric sensor. After a following signal is formed via the operational amplifier A1, the signal is input to a chip STM32F429 in the microprocessor for an analog/digital conversion to be used, so as to determine whether the resonance enhanced piezoelectric sensor is normally accessed.

The sensor signal selection circuit includes a serial frequency selection circuit and a parallel frequency selection circuit which are connected in series to an input terminal of the low-pass filter resistor in sequence, and an output terminal of the serial frequency selection circuit is also connected to the sensor signal processing circuit. Specifically, the serial frequency selection circuit includes a polar capacitor C33 connected to the input terminal of the low-pass filter resistor R31; an output terminal of the polar capacitor C33 is connected in series with a capacitor C45 and an inductor L3 in sequence; an output terminal of the inductor L3 is connected to the sensor signal processing circuit; the parallel frequency selection circuit includes an inductor L4 and a capacitor C16 which are connected in parallel to the output terminal of the inductor L3, and output terminals of the capacitor C16 and the inductor L4 are commonly grounded.

The capacitor C45 and the inductor L3 form a serial LC frequency selection circuit. When a signal frequency reaches the resonance frequency, an impedance of the serial frequency selection circuit to the signal is close to zero. The inductor L4 and the capacitor C16 form a parallel LC frequency selection circuit. When the signal frequency reaches the resonance frequency, an equivalent impedance of parallel LC frequency selection circuit to the signal is close to infinitely great. For example, assuming that a frequency of an output signal of the resonance enhanced piezoelectric sensor is 32 KHz, an appropriate capacitance value and inductance value are selected, such that the resonance frequency of an LC loop is 32 KHz, the two LC loops will form a frequency selection circuit with an extremely high quality factor (an extremely high Q value). The selection of the capacitance value and inductance value refers to the following formula:

$$f = \frac{1}{2\pi\sqrt{LC}}$$

In this embodiment, the sensor signal processing circuit is set as a band-pass filter circuit, including a resistor R50 and a capacitor C48 which are arranged in series; an input terminal of the resistor R50 is connected to the output terminal of the inductor L3; an input terminal of the capacitor C48 is connected to a capacitor C47; an output terminal of the capacitor C48 is connected to a resistor R51; an output terminal of the capacitor C48, an output terminal of the capacitor C47 and an output terminal of the resistor R51 are respectively connected to the programmable gain circuit. The resistor R50, the capacitor C47, the capacitor C48 and the resistor R51 further perform frequency selection on the signal, and send the signal to the programmable gain circuit. An amplitude of a sound signal detected by the resonance enhanced piezoelectric sensor has a wider varying range, and only the programmable gain circuit can cover a wider measurement range.

The programmable gain circuit includes a programmable amplifier U1; an external reference terminal of the programmable amplifier U1 is connected to a reference voltage circuit; an analog input terminal of the programmable amplifier U1 is connected to the band-pass filter circuit; an analog output terminal of the programmable amplifier U1 is connected to the microprocessor. The programmable amplifier U1 can use a chip MCP6S21. In order to make an output signal (Vout) of the chip MCP6S21 within a collection range of the chip STM32F429, a reference voltage is required to be raised to 1.65V. In this embodiment, the reference voltage circuit is specially designed. U1 is a programmable gain amplifier; pin 1 (VOUT) of U1 is an output; pin 2 of U1 is an input; pin 3 (VREF) of U1 is a reference voltage; pin 4 (VSS) of U1 and pin 8 (VDD) of U1 are power supplies; and signals of pins 5, 6, and 7 of U1 coming from the single-chip microcomputer are used to configure a gain of the amplifier. The model of U1 is MCP6S21.

The reference voltage circuit includes an operational amplifier A2; an non-inverting input terminal of the operational amplifier A2 is connected to a power voltage through a voltage dividing resistor R47; a grounding capacitor C35, a grounding capacitor C32 and the grounding capacitor C37 in parallel are sequentially connected between the voltage dividing resistor R47 and the power voltage, and the grounding capacitor C35, the grounding capacitor C32 and the grounding capacitor C37 are commonly grounded; a voltage dividing resistor R48 and a grounding capacitor C39 are connected in parallel between the voltage dividing resistor R47 and the non-inverting input terminal of the operational amplifier A2; the voltage dividing resistor R48 and the grounding capacitor C39 are commonly grounded; an inverting input terminal of the operational amplifier A2 is connected to an external reference terminal of the operational amplifier A2; an output terminal of the operational amplifier A2 is also connected to the external reference terminal of the operational amplifier A2 through a resistor R49; a grounding capacitor C22 and a grounding capacitor C23 are also arranged between the resistor R49 and the external reference terminal of the operational amplifier A2; and the grounding capacitor C22 and the grounding capacitor C23 are commonly grounded. The operational amplifier A2 is set as a chip LMC6482IM/NS/SOP8. The reference voltage circuit uses the voltage dividing resistor R47 and the voltage dividing resistor R48 for a voltage division, and then the operational amplifier A2 is used for voltage following, thereby improving the driving capability. A voltage value of a VDD terminal of the chip MCP6S21 is 3.3 V, and a voltage value of a VREF terminal is 1.65 V.

Figure 5:
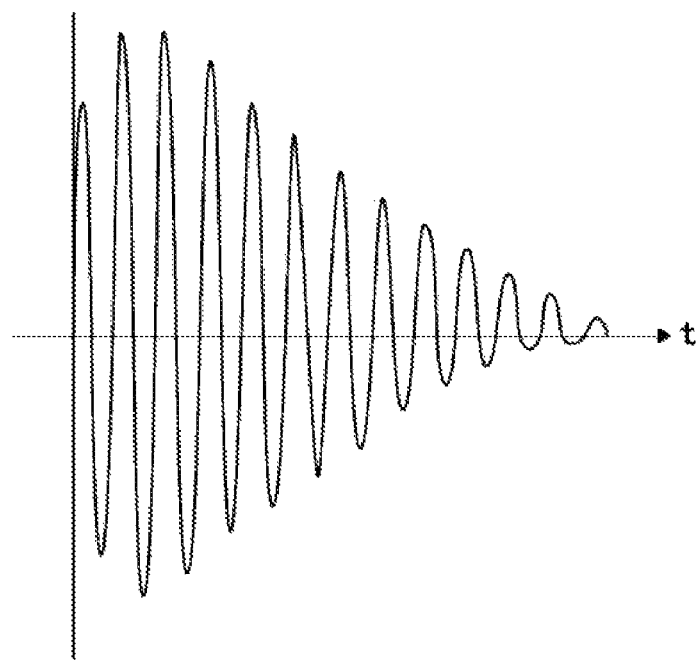
FIG. 5 is a diagram of a signal detected by a resonance enhanced piezoelectric sensor according to an embodiment of the present disclosure.
Figure 6:
FIG. 6 is an envelope signal diagram corresponding to a signal detected by a resonance enhanced piezoelectric sensor and generated in an embodiment of the present disclosure.
Figure 7:
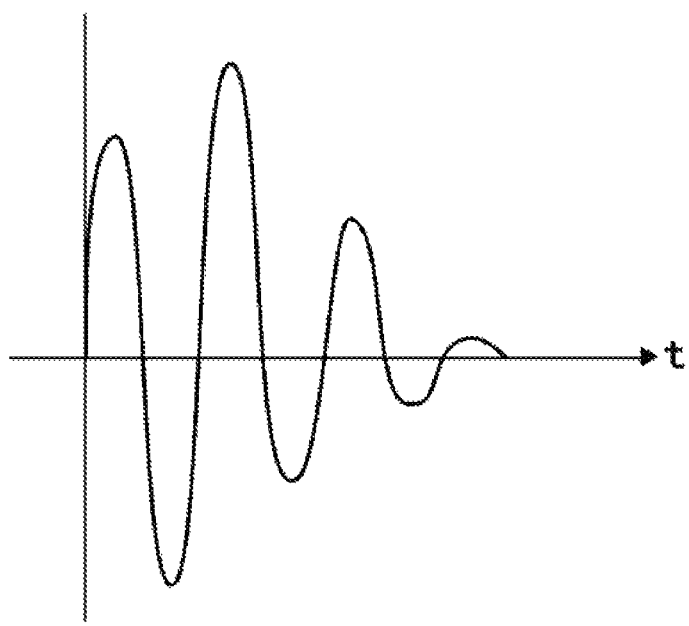
FIG. 7 is an audio signal diagram corresponding to a signal detected by a resonance enhanced piezoelectric sensor according to an embodiment of the present disclosure.

For example, a signal at Vout of the operational amplifier A2 is an amplitude-modulated signal with 32 KHz (as shown in FIG. 5), and an analog-digital converter (ADC) (a sampling rate is up to 2.4 Msps) built in the ARM microprocessor is used to collect data on this signal; a floating point unit (FPU) (equivalent to a digital signal processor (DSP)) inside the ARM microprocessor quickly samples, detects, and solves an envelope on the signal, so as to obtain an envelope signal (as shown in FIG. 6). The formed envelope signal can be directly displayed on the LCD and can be used by a user of a bearing detector. The actual process of solving the envelope in this process is a demodulation process, which is well known to those ordinary skilled in the art. It will not be described in detail here. The ARM microprocessor further modulates the envelope signal to an audio signal (with a frequency of several hundreds of Hz) that can be heard by human ears (as shown in FIG. 7), so that the fault diagnosis engineer can hear it from the earphone, achieving detection and utilization of an impact pulse signal generated by initial or early faults of bearings. The envelope signal can also be stored by the ARM microprocessor. After the measurement is completed, the signal during the processing can be statistically analyzed, such that bearing states or faults may be analyzed using dBm/dBc (peak value/carpet value), HR/LR (high frequency/low frequency), and etc. In FIGS. 5-7, the abscissas represent time, and the ordinates represent voltage.

In most bearing faults, poor lubrication, bearing faults and temperature rise always occur in accompany, so a pyroelectric module can be additionally deployed for the bearing detector to detect the temperature of a shaft cover.

The quality of a vibrometer used in a conventional technology is mainly reflected by the frequency pass capability. That is, many frequency signals are required to pass through a conditioning circuit. The vibrometer mainly detects frequency information which is a continuous signal with limited power and unlimited energy. However, what the detector of this embodiment can detect is a transient signal with limited energy, so it can detect the impact pulse signal formed by a collision between a ball and rough textures of a raceway due to poor lubrication in the early stage of a bearing fault. Therefore, this embodiment becomes the only equipment that can detect a thickness of a bearing oil film at present, and can detect a fault and predict the occurrence of the fault 3 to 6 months in advance.

Based on the above, this embodiment has the following advantages:

1. The signal is enriched at a frequency band of 30 KHz to 40 KHz by the resonance enhancement method, so that the signal strength increases by more than 6 to 7 times compared with the original signal strength before enrichment. The fault can be found by the method 3 to 6 months earlier than by the vibration analysis method, and the transient signal in the early stage of the bearing fault can be accurately collected.

2. Since the frequency of the signal is concentrated in a narrow frequency band, it is easier to amplify the signal with a stable gain.

3. Since the fault signal after resonance enhancement is an energy signal, it mainly depends on an energy value and no longer carries frequency information. After detection processing, a lower-frequency signal will be obtained, so a lower sampling rate can be used to achieve signal collection.

4. The comparison method of dBm/dBc (peak value/ carpet value) and HR/LR (high frequency/low frequency) for the resonance enhanced piezoelectric sensor can be used to analyze a lubrication condition of a bearing.

The principle and implementation modes of the present disclosure are described by applying specific examples herein. The descriptions of the above embodiments are only intended to help to understand the method of the present disclosure and a core idea of the method. In addition, those ordinary skilled in the art can make changes to the specific implementation modes and the application scope according to the idea of the present disclosure. From the above, the contents of the specification shall not be deemed as limitations to the present disclosure.

What is claimed is:

1. A detector capable of detecting bearing faults in advance, comprising:
   a microprocessor, an input terminal of which is connected to a power supply and an output terminal of which is connected to a detection information output device; and
   a resonance enhanced piezoelectric sensor, wherein a sensor trigger detection circuit is electrically connected between the resonance enhanced piezoelectric sensor and the microprocessor; an input terminal of the sensor trigger detection circuit is connected in parallel with a sensor signal selection circuit; the sensor signal selection circuit is connected in series with a sensor signal processing circuit; an output terminal of the sensor signal processing circuit is connected in series with a programmable gain circuit; the programmable gain circuit is connected to the microprocessor; and the sensor trigger detection circuit, the sensor signal selection circuit, the sensor signal processing circuit, and the programmable gain circuit are respectively connected to the power supply.

2. The detector capable of detecting the bearing faults in advance according to claim 1, wherein the resonance enhanced piezoelectric sensor comprises an anode conductive rod and a cathode conductive rod arranged oppositely; a piezoelectric ceramic sheet is clamped between the anode conductive rod and the cathode conductive rod; an end of the anode conductive rod and an end of the cathode conductive rod that clamp the piezoelectric ceramic sheet are sleeved outside by a conductive rod connecting and fastening sleeve; electric insulation devices are arranged between the conductive rod connecting and fastening sleeve and the anode conductive rod and between the conductive rod connecting and fastening sleeve and the piezoelectric ceramic sheet; and the conductive rod connecting and fastening sleeve and the cathode conductive rod are in clearance fit connection.

3. The detector capable of detecting the bearing faults in advance according to claim 2, wherein the electric insulation devices comprise an electric insulation ring arranged between the piezoelectric ceramic sheet and the conductive rod connecting and fastening sleeve, and an electric insulation sleeve arranged between the anode conductive rod and the conductive rod connecting and fastening sleeve; and one end of the electric insulation sleeve resists against the electric insulation ring, and another end of the electric insulation sleeve extends to an outer side of the conductive rod connecting and fastening sleeve.

4. The detector capable of detecting the bearing faults in advance according to claim 3, wherein end surfaces of the anode conductive rod, the cathode conductive rod, and the piezoelectric ceramic sheet are respectively circular; an end surface diameter of the cathode conductive rod is greater than an end surface diameter of the piezoelectric ceramic sheet; and a part of the end surface of the cathode conductive rod exceeding the end surface of the piezoelectric ceramic sheet forms an insulation ring positioning platform of the electric insulation ring.

5. The detector capable of detecting the bearing faults in advance according to claim 3, wherein an end of the anode conductive rod that is in contact with the piezoelectric ceramic sheet is provided with an insulation sleeve limiting convex ring; and an insulation sleeve limiting concave ring fitting with a limiting boss is arranged on the electric insulation sleeve.

6. The detector capable of detecting the bearing faults in advance according to claim 1, wherein the sensor trigger detection circuit comprises a low-pass filter resistor which is electrically connected to an output terminal of the resonance enhanced piezoelectric sensor; an output terminal of the low-pass filter resistor is grounded through a low-pass filter capacitor; the output terminal of the low-pass filter resistor is also connected to a non-inverting input terminal of an operational amplifier; an inverting input terminal of the operational amplifier is connected to its output terminal; the output terminal of the operational amplifier is connected to the microprocessor; a power terminal of the operational amplifier is connected to the power supply through a voltage dividing resistor; and the voltage dividing resistor is also safely grounded through a capacitor.

7. The detector capable of detecting the bearing faults in advance according to claim 6, wherein the sensor signal selection circuit comprises a serial frequency selection circuit and a parallel frequency selection circuit which are connected in series to an input terminal of the low-pass filter resistor in sequence, and an output terminal of the serial frequency selection circuit is also connected to the sensor signal processing circuit; wherein
   the serial frequency selection circuit comprises a polar capacitor connected to the input terminal of the low-pass filter resistor; an output terminal of the polar capacitor is connected in series with a capacitor and an inductor in sequence; an output terminal of the inductor is connected to the sensor signal processing circuit; and the parallel frequency selection circuit comprises an inductor and a capacitor which are connected in parallel to the output terminal of the inductor, and output terminals of the capacitor and the inductor are commonly grounded.

8. The detector capable of detecting the bearing faults in advance according to claim 7, wherein the sensor signal processing circuit is set as a band-pass filter circuit, comprising a resistor and a capacitor which are arranged in series; an input terminal of the resistor is connected to the output terminal of the inductor; an input terminal of the capacitor is connected to a capacitor; an output terminal of the capacitor is connected to a resistor; and an output terminal of the capacitor, an output terminal of the capacitor and an output terminal of the resistor are respectively connected to the programmable gain circuit.

9. The detector capable of detecting the bearing faults in advance according to claim 8, wherein the programmable gain circuit comprises a programmable amplifier; an external reference terminal of the programmable amplifier is connected to a reference voltage circuit; an analog input terminal of the programmable amplifier is connected to the band-pass filter circuit; and an analog output terminal of the programmable amplifier is connected to the microprocessor.

10. The detector capable of detecting the bearing faults in advance according to claim 1, wherein the detection information output device comprises an audio conversion circuit arranged in the microprocessor, an output terminal of the audio conversion circuit being connected to an audio player; and a liquid crystal display (LCD) connected to the output terminal of the microprocessor.

11. The detector capable of detecting the bearing faults in advance according to claim 2, wherein the detection information output device comprises an audio conversion circuit arranged in the microprocessor, an output terminal of the audio conversion circuit being connected to an audio player; and a liquid crystal display (LCD) connected to the output terminal of the microprocessor.

12. The detector capable of detecting the bearing faults in advance according to claim 3, wherein the detection information output device comprises an audio conversion circuit arranged in the microprocessor, an output terminal of the audio conversion circuit being connected to an audio player; and a liquid crystal display (LCD) connected to the output terminal of the microprocessor.

13. The detector capable of detecting the bearing faults in advance according to claim 4, wherein the detection information output device comprises an audio conversion circuit arranged in the microprocessor, an output terminal of the audio conversion circuit being connected to an audio player; and a liquid crystal display (LCD) connected to the output terminal of the microprocessor.

14. The detector capable of detecting the bearing faults in advance according to claim 5, wherein the detection information output device comprises an audio conversion circuit arranged in the microprocessor, an output terminal of the audio conversion circuit being connected to an audio player; and a liquid crystal display (LCD) connected to the output terminal of the microprocessor.

15. The detector capable of detecting the bearing faults in advance according to claim 6, wherein the detection information output device comprises an audio conversion circuit arranged in the microprocessor, an output terminal of the audio conversion circuit being connected to an audio player; and a liquid crystal display (LCD) connected to the output terminal of the microprocessor.

16. The detector capable of detecting the bearing faults in advance according to claim 7, wherein the detection information output device comprises an audio conversion circuit arranged in the microprocessor, an output terminal of the audio conversion circuit being connected to an audio player; and a liquid crystal display (LCD) connected to the output terminal of the microprocessor.

17. The detector capable of detecting the bearing faults in advance according to claim 8, wherein the detection information output device comprises an audio conversion circuit arranged in the microprocessor, an output terminal of the audio conversion circuit being connected to an audio player; and a liquid crystal display (LCD) connected to the output terminal of the microprocessor.

18. The detector capable of detecting the bearing faults in advance according to claim 9, wherein the detection information output device comprises an audio conversion circuit arranged in the microprocessor, an output terminal of the audio conversion circuit being connected to an audio player; and a liquid crystal display (LCD) connected to the output terminal of the microprocessor.

\* \* \* \* \*